Dec. 4, 1928.

J. A. WRIGHT 1,694,049

REAR AXLE ASSEMBLY

Filed Aug. 3, 1927

INVENTOR
JAMES A. WRIGHT
By
ATTORNEY.

Dec. 4, 1928.
J. A. WRIGHT
1,694,049
REAR AXLE ASSEMBLY
Filed Aug. 3, 1927    3 Sheets-Sheet 2
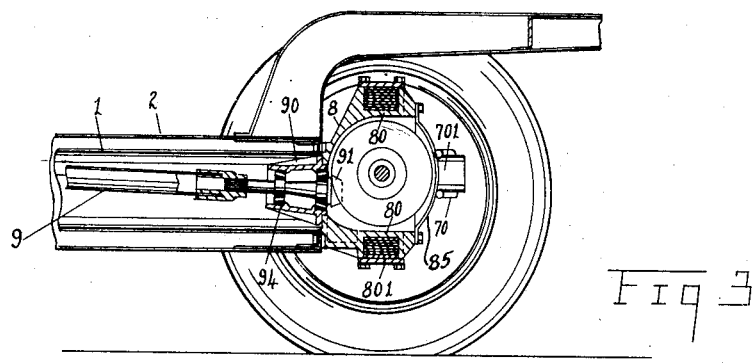
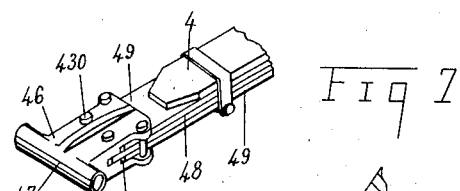
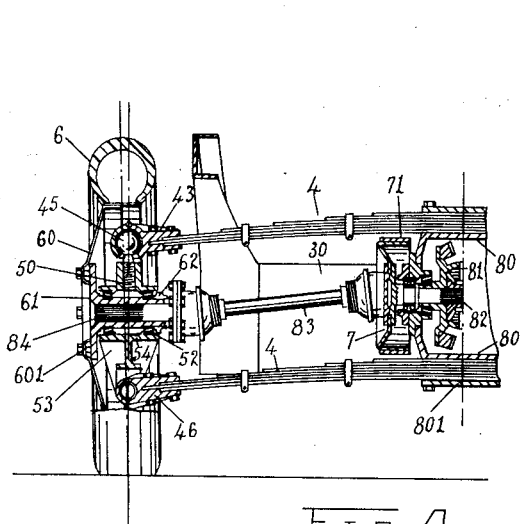
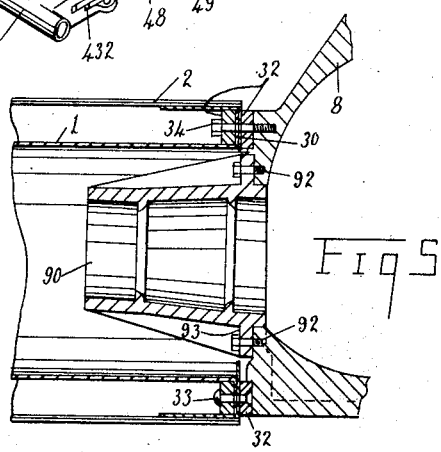
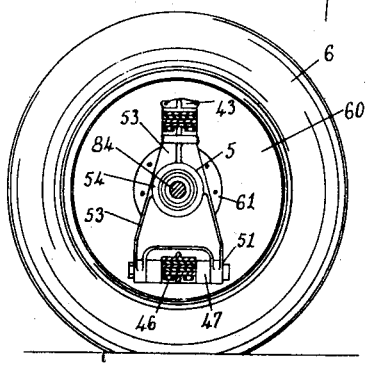
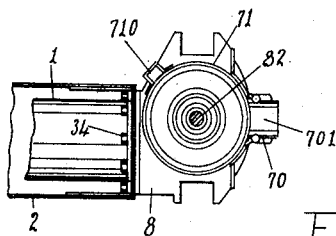
INVENTOR.
JAMES A. WRIGHT.
By
ATTORNEY.

Dec. 4, 1928.

J. A. WRIGHT 1,694,049

REAR AXLE ASSEMBLY

Filed Aug. 3, 1927

INVENTOR.
JAMES A. WRIGHT.
By
ATTORNEY.

Patented Dec. 4, 1928.

1,694,049

UNITED STATES PATENT OFFICE.

JAMES A. WRIGHT, OF MONTREAL, QUEBEC, CANADA.

REAR-AXLE ASSEMBLY.

Application filed August 3, 1927. Serial No. 210,413.

This invention relates to the rear axle assembly of motor vehicles and particularly to those having independent wheel suspension, by means of transverse springs.
The object of the invention is to provide an improved rear wheel drive, brake mounting and spring suspension.

A further object is to provide an improved wheel carrier and wheel mounting thereon.
A further object is to provide an improved form of spring eye and wheel guiding bearing on the wheel carrier.

A further object is to provide an improved spring supporting differential casing and driving pinion mounting.

A further object is to provide an improved means for compensating the variation in length of the drive mechanism in the wheel during the deflection of the springs due to road levels, etc.

Further objects will be set out hereinafter.

The invention consists of a two transverse spring rear suspension, in contrast to the convential three and four spring rear suspension. These springs are mounted above and below a substantially designed differential casing which has a sleeve attachment to provide a driving pinion bearing and brackets supporting the brake control.

The ends of the springs have special spring eyes journalled at the top and bottom of a triangular wheel carrier with a broad base, mounted on the sleeve axle of the wheel, on the load plane of the wheel.

The drive from the differential to the wheels comprises a Cardan shaft with stub shafts at each end, the inner stub shaft carrying the brake drum, the outer one being splined to slide in the sleeve axle of the wheel.

The invention is specially adapted to form part of the general assembly disclosed in the pending application Serial No. 179,992 filed on the 31st March, 1927, and to be secured to the frame therein disclosed and claimed, in order to provide the rear suspension and rear drive suitable for such a motor chassis.
Reference is made to the accompanying drawings in which—

Fig. 3, is a vertical section on the line 3—3 of Fig. 2.

Fig. 4, is a vertical cross section on the line 4—4 of Fig. 2.

Fig. 5, is an enlarged vertical section of a portion of Fig. 3.

Fig. 6, is a view of the wheel carrier from inside the wheel.

Fig. 7 is a perspective view of the bottom spring end bearing.

Fig. 8 is a side view of the differential casing and brake drum.

Figure 1:
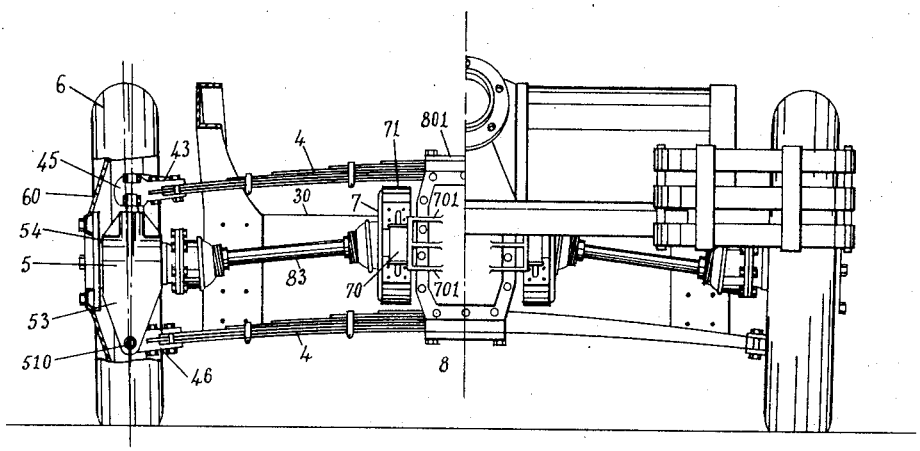
Fig. 1, is a rear view partly in vertical cross section.
Figure 2:
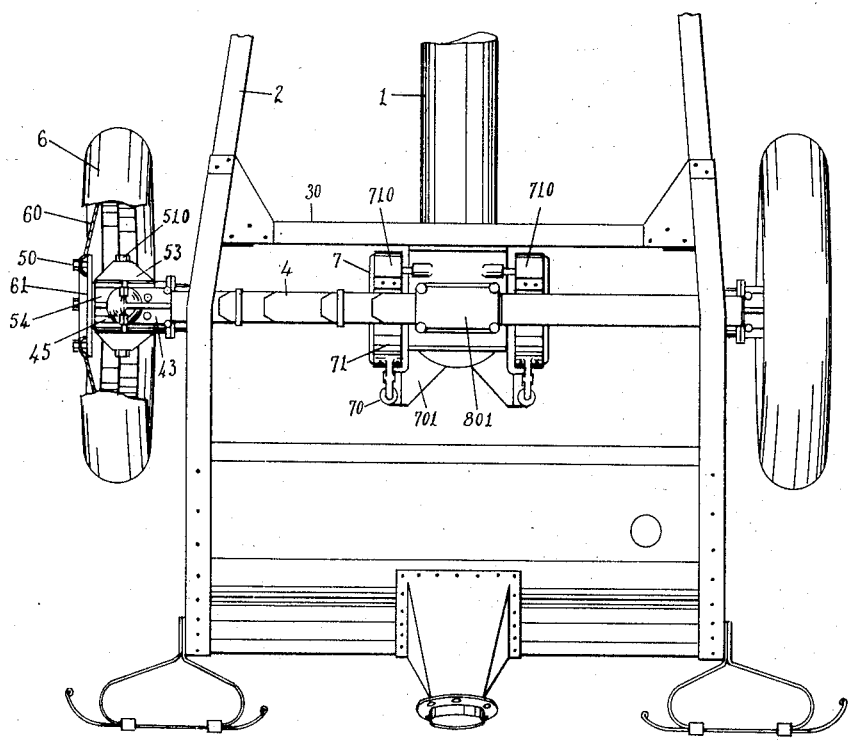
Fig. 2, is a plan view of the rear axle assembly.
Figure 9:
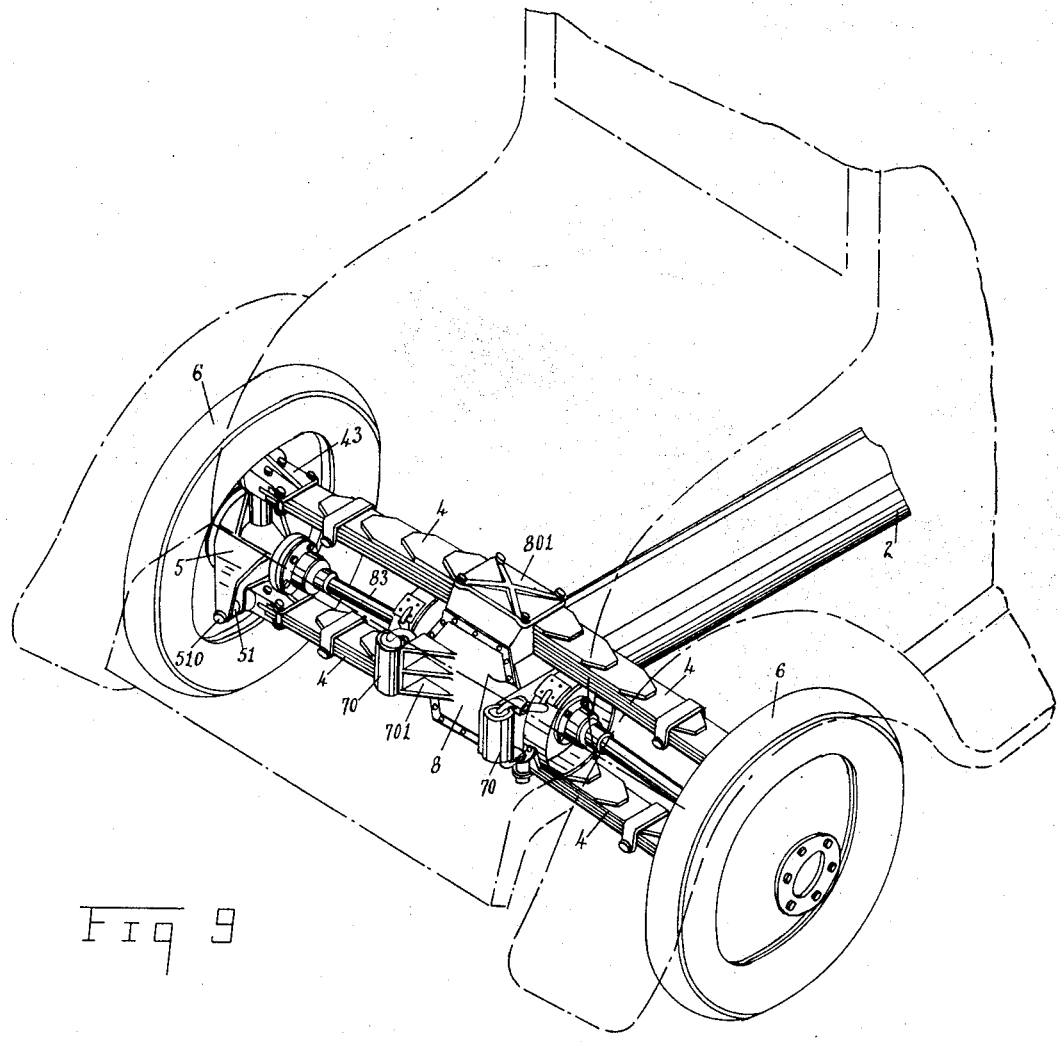
Fig. 9 is a perspective view of the assembly.

The chassis frame as disclosed in application Serial No. 179,992 has channelled side members 2, and a channelled rear cross member 30, with a central torque tube 1, riveted through rings 32, to the web of the rear cross member 30, around a circular aperture therein as shown in Figure 5.

The differential casing 8, is secured to the riveted ring connection 32, by studs 34. Transverse spring seats 80, with anchor plates 801, securely house the central portion of the springs 4, in the top and bottom of the casing 8.

A sleeve 90, with a flange 93, is bolted by the bolts 92, to the casing 8, and extends into the torque tube 1. In this sleeve 90, the driving pinion 91, is journalled on roller bearings 94.

Projecting outwardly from the rear cover of the casing 8, are brackets 701, supporting the brake controls 70.

The rear plate 85, of the casing 8, is removable.

The brake drums 7, are mounted on the stub shafts 82, driven by the differential 81.

The wheel carriers 5, are triangular in shape with a central sleeve 54, a socket for a ball headed screw pin 50, above, and a forked broad bearing 51, below, journalling a bolt 510, parallel to the central line of the chassis. Ribs 53, on each side of the socket and at each edge of the lower portion of the wheel carrier give the necessary strength.

The wheel carrier 5 is mounted on roller bearings 52, about the sleeve axle 62, of the wheel 6, and balanced on the load plane of the wheel, so that the ball headed screw pin 50, and the bolt 510, are also in that plane.

The flange 61, of the sleeve axle 62, which forms the hub of the wheel 6, is bolted to the disc 60, of the wheel 6, by bolts 601.

The upper spring terminates in a spring eye 43, which fits over the ball of the pin 50. The details of this spring eye are described and claimed in my pending application Serial No. 188,768 filed on the 4th of May, 1927.

The lower spring eye 46, is shown in Fig. 7, and consists of a slotted forging in which the end of the spring is secured. The end of the spring eye 46, is a cross sleeve 47, extending outwardly on both sides and fits between the forked bearings 51, of the wheel carrier 5. The sleeve 47, is journalled on a bolt 510, extending through the forked bearing 51. The middle leaf 48, of the spring 4, is rigidly secured to the spring eye 46, by the bolts 430, and the upper and lower leaves 49, of the spring are not attached to the spring eye but are held from side movement by the bolts 431. These upper and lower leaves 49, are free to slide on the middle leaf 48, within the slot 432, of the spring eye 43.

The operation of the invention is as follows:—The differential casing being of robust construction is rigidly secured to the frame cross member and torque tube, and provides a firm housing for the two transverse springs.
The sleeve attached to the differential casing and entering the torque tube provides a rigid bearing for the driving pinion shaft journalled therein on roller bearings.

The brake control is also firmly mounted on the brackets extending from the differential casing, to which the brake bands are also anchored. The brake controls being mounted on the rear plate of the casing which is removable, are also removable.
The stub shafts driven by the differential are journalled in the sides of the casing on bearings.

The differential casing therefore provides a very substantial connection between the chassis frame and the transverse springs as well as a rigid support to the driving mechanism passing through it.

The transverse springs are broad and at their ends are coupled to the wheel carriers in the load plane of the wheel. The load is therefore transferred directly from the frame to the wheels through the springs.

The wheel carrier is held parallel to the central line of the chassis through the lower spring by the lower spring eye with its long sleeve in the load plane of the wheel, while the upper spring eye provides a more flexible connection between the upper spring and the wheel carrier, but maintains the wheel carrier vertically parallel to the vertical line of the chassis, in the load plane of the wheel.

The wheel carrier being thus held to move only in a vertical direction, holds the wheel to that movement only, and provides a firm setting for the splined stub shaft of the driving axle which is adapted to slide in the sleeve axle of the wheel hub.

The spring terminals provide a very firm and durable mounting in which the upper and lower leaves add greatly to the efficiency of the springs in maintaining the position of the wheel carrier.

With this arrangement of the rear axle assembly the wheels are held parallel to the center line of the chassis during any bending movement of the springs either separately or together, thereby maintaining the body of the car in a vertical position, however uneven the road may be.

The driving power supplied to the differential through the driving pinion journalled in the sleeve secured to the casing, is transmited to each wheel journalled in the vertical wheel carriers through brake controlled stub shafts. By this means there is a minimum of unsprung weight in the rear axle asembly and the driving mechanism is protected from shock or stress and is not affected by the movement of the wheels.

What I claim is:—

1. In a rear axle assembly, a pair of semi-elliptic springs housed centrally in seats in the top and bottom of the differential casing, the ends of the springs being mounted in spring eyes coupled to the wheel carriers in the load plane of the wheel, the upper spring eye having a spherical casing enclosing the ball head of a pin projecting upwardly from the wheel carrier, the lower spring eye having a T shaped end sleeve journalled in a forked bearing projecting downwardly from the wheel carrier.

2. In a rear axle assembly, a pair of semi-elliptic springs housed centrally in seats in the top and bottom of the differential casing, the ends of the springs being mounted in spring eyes coupled to the triangular wheel carriers in the load plane of the wheels, the upper spring eye having a spherical casing enclosing the ball head of a pin projecting upwardly from the wheel carrier, the lower spring eye having a T shaped end sleeve journalled in a forked bearing projecting downwardly from the wheel carrier.

3. In a rear axle assembly, a pair of semi-elliptic springs housed centrally in seats in the top and bottom of the differential casing, the ends of the springs being mounted in spring eyes coupled to the wheel carriers in the load plane of the wheels, which are mounted on roller bearings on the sleeve axle of the wheel hub, the upper spring eye having a spherical casing enclosing the ball head of a pin projecting upwardly from the wheel carrier, the lower spring eye having a T shaped end sleeve, journalled in a forked bearing projecting downwardly from the wheel carrier.

4. In a rear axle assembly, a pair of semi-elliptic springs housed centrally in seats in the top and bottom of the differential casing, the ends of the springs being mounted in spring eyes coupled to the wheel carriers in the load plane of the wheels, which are mounted centrally on the load plane on roller bearings on the sleeve axle of the wheel hub, the upper spring eye having a spherical casing enclosing the ball head of a pin projecting upwardly from the wheel carrier, the lower spring having a T shaped end sleeve, journalled in a forked bearing projecting downwardly from the wheel carrier.

5. In a rear axle assembly, a pair of semi-elliptic springs mounted centrally in parallel on the differential casing and coupled to the wheel carrier in the load plane of the wheel by a ball pivot to the top spring and a broad sleeve bearing to the bottom spring.

6. In a rear axle assembly comprising a pair of semi-elliptic springs housed centrally in the differential casing and coupled at their ends to a wheel carrier in the load plane of the wheel by a ball joint to the top spring and a broad sleeve joint to the bottom spring, with a Cardan shaft drive connection between the differential and the wheel hub.

7. In a rear axle assembly comprising a pair of semi-elliptic springs housed centrally in the differential casing and coupled at their ends to a wheel carrier in the load plane of of the wheel by a ball joint to the top spring and a broad sleeve joint to the bottom spring, with a Cardan shaft drive connection between the differential and the wheel hub, journalled on balanced roller bearings in the sleeve of the wheel carrier.

8. In a rear axle assembly comprising a pair of semi-elliptic springs housed centrally in the differential casing and coupled at their ends to a wheel carrier in the load plane of the wheel, by a ball joint to the top spring and a broad sleeve joint to the bottom spring, with a Cardan shaft drive connection between the differential and the wheel hub, and a main drive shaft coupled to a geared pinion meshing with the differential, journalled in a sleeve secured to the differential casing, and extending through the frame cross member into the central torque tube.

9. In a rear axle assembly comprising a pair of semi-elliptic springs housed centrally in the differential casing and coupled at their ends to a wheel carrier in the load plane of the wheel by a ball pivot to the top spring and a broad sleeve joint to the bottom spring, with a Cardan shaft drive connection between the differential and the wheel hub, and brake drums mounted on the differential stub shafts having control means and band anchor mounted on brackets projecting from the differential casing.

10. In a spring eye having a slotted spring coupling, a transverse sleeve journalled in a horizontal bearing in a wheel carrier and adapted to provide for free vertical movement of the spring and to maintain horizontal alignment.

11. In an independent rear wheel drive having transverse springs, secured at their ends to wheel carriers supporting the wheels, a driven stub shaft splined to slide in a hollow stub axle secured to the wheel.

12. In an independent wheel suspension, a wheel carrier having an upper ball pivot coupled to the upper spring and a lower broad bearing coupled to the lower spring.

JAMES A. WRIGHT.